July 31, 1951 S. FRANCHOK ET AL 2,562,308
DOUBLE JAW ANIMAL TRAP
Filed Nov. 8, 1949
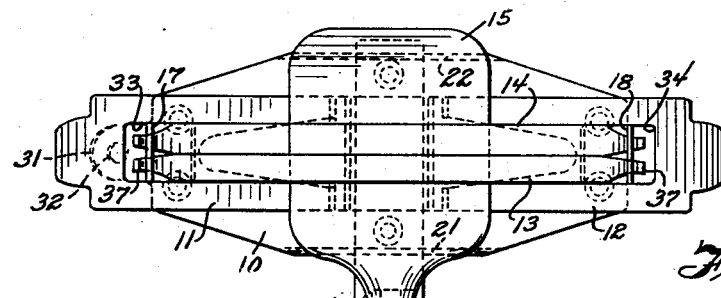
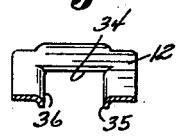
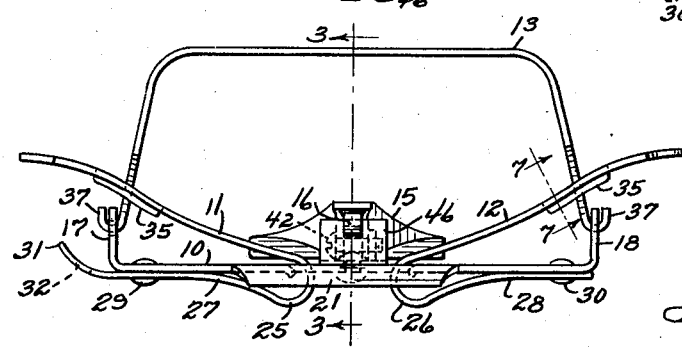
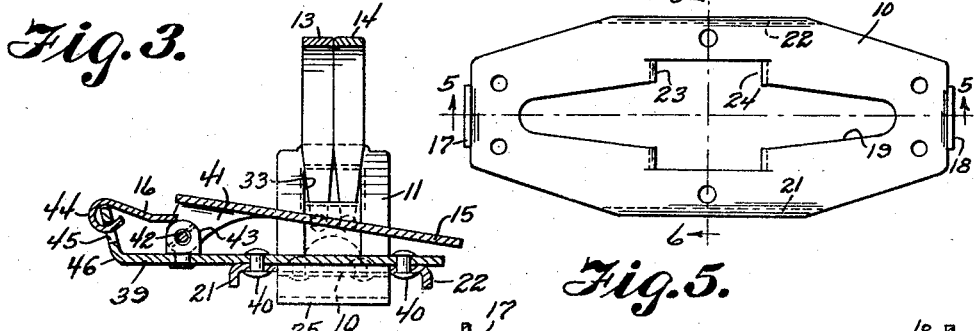
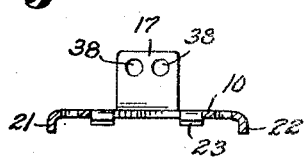
INVENTORS
Steve Franchok
Steve Chakan
BY Victor J. Evans & Co.
ATTORNEYS Patented July 31, 1951

2,562,308

UNITED STATES PATENT OFFICE 2,562,308

DOUBLE JAW ANIMAL TRAP

Steve Franchok and Steve Chakan, Morris, Pa.

Application November 8, 1949, Serial No. 126,084

4 Claims. (Cl. 43—88)

This invention relates to animal traps particularly adapted for use by trappers in the woods, and in particular the invention relates to an animal trap having two pivotally mounted U-shaped gripping jaws actuated by springs and retained in the open position by a trigger which is controlled by a treadle.

The purpose of this invention is to provide improvements in animal traps of this type that facilitate the closing operation thereof so that the trap closes with a quick snap action to eliminate escape of animals therefrom.

In the usual type of animal trap of this type, springs urge gripping jaws into closed relation and when the jaws are released by a trigger or treadle actuated by an animal the sharp coacting edges of the springs and jaws cause a slight hesitation that permits animals to escape. Furthermore when the spring action is not equalized at both ends of the trap one spring retards the action of the other and this also permits animals to escape. With these thoughts in mind this invention contemplates an animal trap having U-shaped gripping jaws pivotally mounted in upwardly extended ends of a base with springs positioned to slide upwardly over the ends of the jaws for springing the trap, and with a trigger and treadle for holding the jaws open until the trap is sprung.

The object of this invention is, therefore, to provide improvements in animal traps having spring actuated gripping jaws wherein the action of springs for closing the jaws is equalized to expedite closing of the jaws.

Another object of the invention is to provide an improved animal trap having spring actuated gripping jaws wherein arcuate surfaces are provided between the springs and jaws to facilitate the snap action in closing the jaws.

Another object of the invention is to provide an improved base structure for animal traps having spring actuated jaws wherein flanges are provided on the edges of the base for stiffening the base, thereby making it possible to use comparatively light weight material.

A further object of the invention is to provide an improved animal trap having spring actuated gripping jaws which is of a simple and economical construction.

With these and other objects and advantages in view the invention embodies an animal trap having an elongated base with upturned ends and having U-shaped jaws pivotally mounted in the upturned ends and actuated by springs, and also having a trigger in combination with a treadle for releasing the springs and jaws.

Other features and advantages of the invention will appear for the following description taken in connection with the drawings wherein:

Figure 1 is a plan view of the trap.

Figure 2 is a side elevation of the trap illustrating the parts in the closed position.

Figure 3 is a cross section through the trap taken on line 3—3 of Figure 2.

Figure 4 is a plan view of the base of the trap with the other parts omitted.

Figure 5 is a longitudinal section through the base of the trap taken on line 5—5 of Figure 4.

Figure 6 is a cross section through the trap base taken on line 6—6 of Figure 4.

Figure 7 is a cross section through one of the springs taken on the line 7—7 of Figure 2 and showing the arcuate inner edges at the sides of the jaw opening therethrough.

Referring now to the drawings wherein like reference characters denote corresponding parts the improved animal trap of this invention includes a base 10, springs 11 and 12, gripping jaws 13 and 14, a treadle 15 and a trigger 16.

The base 10 is formed as illustrated in Figures 4, 5 and 6 with upwardly extended flanges 17 and 18 at the ends, with an elongated opening 19 extended through the intermediate part thereof and with an enlarged centrally disposed area 20 in the center through which the springs 11 and 12 extend. The sides 21 and 22 of the base are bent downwardly, as shown in Figure 6 to reinforce the material thereof and the edges 23 and 24 at the sides of the open area 20 are also rolled downwardly, as illustrated in Figure 5 to provide bearing surfaces for the springs.

The springs 11 and 12 are formed in the shape of a U with the arms thereof connected by arcuate sections 25 and 26 that extend through the opening 20 and the lower arms 27 and 28, below the base 10 are secured to the base by rivets 29 and 30, respectively. The arm 27 is provided with an extended end 31 having a chain receiving opening 32 therein providing means for anchoring the trap by a chain or the like.

The upwardly extended arms of the springs 11 and 12 are provided with openings 33 and 34, respectively and the vertically disposed end sections of the jaws 13 and 14 extend through these openings as shown in Figure 1. As illustrated in Figure 7 the edges 35 and 36 at the sides of the openings 33 and 34 are bent downwardly to provide arcuate surfaces for contacting the coacting sides or edges of the gripping jaws.

The ends of the jaws are tapered as illustrated in Figure 3 and hook shaped sections 37 on the ends of the jaws extend through openings 38 in the flanges 17 and 18, providing means for pivotally mounting the jaws on the base.

The treadle 15 and trigger 16 are carried by a transversely disposed bar 39 attached to the base by rivets 40 and, as shown in Figure 3 ears 41 on the end of the treadle 15 are pivotally mounted on a screw 42 in a bearing 43, mounted on the bar 39, and the trigger 16 is formed with an eye 44 by which the trigger is pivotally mounted in an opening 45 of a flange 46 extended upwardly from the end of the bar.

With the parts arranged in this manner the trap is set by opening the jaws 13 and 14 and as the jaws are moved downwardly to substantially horizontal positions the springs 11 and 12 are also moved downwardly to positions below the ends of the jaws. With the jaw 13 positioned below the trigger 16 and with the trigger below the inner end of the treadle 15 the jaws will be held downwardly until pressure is applied to the treadle whereby the treadle is moved downward to the position shown in Figure 3 to release the trigger and jaws.

The arcuate contacting surfaces 35 and 36 of the springs slide upwardly against the edges of the jaws with an easy equalized movement that makes it possible for the jaws to snap to the closed position instantly. Bending the edges of the base downwardly reinforces the material of the base making it possible to use comparatively thin material and thereby reducing the weight of the trap which is essential to trappers carrying a plurality of traps.

It will be understood that modifications may be made in the design and arrangement of the parts without departing from the spirit of the invention.

What is claimed is:

1. A spring actuated animal trap comprising a base with an elongated opening extended through the intermediate part thereof and having upwardly extended flanges on the ends thereof, U-shaped jaws having their ends pivotally mounted in the flanges of the base, U-shaped springs extended through the opening in the intermediate part of the base with the lower arms thereof attached to the base and with the upper arms thereof having openings therethrough extended over the ends of the base and so positioned that the ends of the U-shaped jaws extended through said openings therein, a trigger pivotally mounted on the base for holding the jaws open, and a treadle also pivotally mounted on the base and positioned to hold the trigger with the jaws open until pressure is applied thereto.

2. A spring actuated animal trap comprising a base with an elongated opening extended through the intermediate part thereof and having upwardly extended flanges on the ends thereof, U-shaped jaws having their ends pivotally mounted in the flanges of the base, U-shaped springs extended through the opening in the intermediate part of the base with the lower arms thereof attached to the base and with the upper arms thereof having openings therethrough extended over the ends of the base and so positioned that the ends of the U-shaped jaws extended through said openings therein, said springs having arcuate downwardly extended flanges in the sides of the openings with the arcuate surfaces of the flanges positioned to contact coacting edges of the jaws, a trigger pivotally mounted on the base for holding the jaws open, and a treadle also pivotally mounted on the base and positioned to hold the trigger with the jaws open until pressure is applied thereto.

3. In a spring actuated animal trap, the combination which comprises an elongated base having flanges extended upwardly at the ends thereof, with flanges extended downwardly on the sides thereof and having an elongated opening with shoulders in the sides thereof in the intermediate part of the base, U-shaped gripping jaws having horizontally disposed sections with downwardly extended ends pivotally mounted in the upwardly extended flanges at the ends of the base, a pair of U-shaped springs extended through the opening in the intermediate part of the base with the lower arms thereof attached to the lower surface of the base and with the upwardly extended arms thereof extended outwardly over the upwardly extended flanges at the ends of the base, said springs having openings therein so positioned that the downwardly extended ends of the gripping jaws and flanges of the base extend therethrough with the trap in the set position, a bar transversely positioned on the base and having an upwardly extended flange on one end, a trigger pivotally mounted in the flange of the bar and positioned to receive one of the said U-shaped gripping jaws, and a treadle pivotally mounted on the bar and positioned to overlap the trigger to retain the gripping jaw below the trigger until pressure is applied to the treadle.

4. A trap comprising the combination of a pair of diametrically opposite pivot ears, a pair of leg portions merging together at each ear and diverging from each ear and extending toward the other ear, a pair of spaced opposed parallel portions having the ends thereof secured to the ends of corresponding leg portions, respectively, a pair of substantially U-shaped jaws adapted to be swung toward and away from each other, means pivoting said jaws to said ears, a bracket attached to said parallel portions, an ear terminating said bracket, a pivot bearing on said bracket, a swingable tread plate pivoted on said pivot bearing, a latching trigger pivoted on said last mentioned ear and adapted to be engaged by said tread plate, one of said jaws being adapted to be swung under and to be held by said latching trigger until released by said tread plate, and a pair of spring means for moving said jaws together upon release of said one jaw, each said spring means comprising a spring member bent back upon itself providing a lower stretch portion, an upper stretch portion and a bight portion connecting said stretch portions, and means securing each of said lower stretch portions to the bottom of the merging portion of a pair of said leg portions adjacent one of said pivot ears and in alignment with said ears whereby each bight portion is located between said parallel portions and each of said upper stretch portions extends over the adjacent ear, and each of said upper stretch portions being provided with an opening for receiving said jaws, whereby said jaws are simultaneously forced together in clamping relationship upon depression of said tread plate.

STEVE FRANCHOK.
STEVE CHAKAN.

REFERENCES CITED

The following references are of record in the file of this patent:

UNITED STATES PATENTS

| Number | Name | Date |
|---|---|---|
| 1,645,095 | Enzenauer | Oct. 11, 1927 |

FOREIGN PATENTS

| Number | Country | Date |
|---|---|---|
| 618,176 | Great Britain | Feb. 17, 1949 |